United States Patent
Bateman et al.

(10) Patent No.: US 8,052,412 B2
(45) Date of Patent: Nov. 8, 2011

(54) METHOD AND APPARATUS FOR STABILIZING STRIP DURING WINDING

(75) Inventors: Ian Roger Bateman, Marino (AU); Craig Anthony Mayman, Salt Lake City, UT (US); Glenn Crawford, North Brighton (AU)

(73) Assignee: Sekisui Rib Loc Australia Pty Ltd. (AU)

( * ) Notice: Subject to any disclaimer, the term of this patent is extended or adjusted under 35 U.S.C. 154(b) by 971 days.

(21) Appl. No.: 11/716,458

(22) Filed: Mar. 9, 2007
(Under 37 CFR 1.47)

(65) Prior Publication Data
US 2008/0061181 A1    Mar. 13, 2008

(30) Foreign Application Priority Data
Mar. 9, 2006  (AU) ................................ 2006901189

(51) Int. Cl.
*B29C 53/78*   (2006.01)
(52) U.S. Cl. ........ 425/322; 425/505; 425/515; 425/319; 425/320; 425/391; 156/192; 156/195; 156/196; 156/200; 156/201
(58) Field of Classification Search ................ 156/191, 156/192, 194, 195, 196, 199, 200, 201, 425, 156/428, 429; 425/319, 320, 321, 322, 391, 425/393, 500, 505, 515
See application file for complete search history.

(56) References Cited

U.S. PATENT DOCUMENTS

| | | | | |
|---|---|---|---|---|
| 2,994,104 A | * | 8/1961 | Mittag | 156/195 |
| 3,237,438 A | | 3/1966 | Tesson | |
| 3,846,202 A | * | 11/1974 | Clarke | 156/143 |
| 3,923,573 A | * | 12/1975 | Hay, II | 156/192 |
| 3,962,019 A | * | 6/1976 | Rejeski | 156/428 |
| 4,103,841 A | | 8/1978 | Flynn et al. | |
| 4,294,636 A | * | 10/1981 | Vitellaro | 156/143 |
| 4,322,262 A | * | 3/1982 | Cottam | 156/392 |
| 4,354,888 A | * | 10/1982 | Bompard et al. | 156/175 |
| 4,417,937 A | * | 11/1983 | Escher et al. | 156/169 |
| 4,459,171 A | * | 7/1984 | McKinney | 156/425 |
| 4,466,854 A | * | 8/1984 | Hawerkamp | 156/429 |
| 4,479,835 A | * | 10/1984 | Kutnyak et al. | 156/143 |

(Continued)

FOREIGN PATENT DOCUMENTS

AU    2003/227090 A    2/2004

(Continued)

*Primary Examiner* — Joseph Del Sole
*Assistant Examiner* — Seyed Masoud Malekzadeh
(74) *Attorney, Agent, or Firm* — Olson & Cepuritis, Ltd.

(57) ABSTRACT

A spool winding assembly for winding a composite strip onto a spool having a hub is disclosed. The strip includes an elongate plastic strip having a flat base portion and a plurality of laterally spaced apart lengthwise extending rib portions upstanding from the base portion; and a plurality of elongate reinforcing members extending lengthwise within respective rib portions, the rib portions and the reinforcing members forming composite ribs. The assembly includes: a main frame, a spool holder for rotatably supporting the spool relative to the main frame, a spool drive unit for driving the spool with respect to the main frame, a carriage mounted for lateral movement with respect to the spool, a bender mounted to the carriage for receiving the strip as it is fed towards the hub of the spool and for deforming the strip to give it a curved base portion, and a bender drive unit operably connected to the bender for driving the strip through the bender.

11 Claims, 18 Drawing Sheets

U.S. PATENT DOCUMENTS

| | | | | |
|---|---|---|---|---|
| 4,495,021 A | * | 1/1985 | Goldsworthy | 156/425 |
| 4,610,403 A | * | 9/1986 | Goekler et al. | 242/439.5 |
| 4,692,196 A | * | 9/1987 | Ellegood et al. | 156/187 |
| 4,812,196 A | * | 3/1989 | Ishii | 156/412 |
| 4,838,971 A | * | 6/1989 | Cacak | 156/173 |
| 4,877,477 A | * | 10/1989 | Yabe et al. | 156/406.4 |
| 4,946,528 A | * | 8/1990 | Takahashi et al. | 156/187 |
| 4,997,503 A | * | 3/1991 | Bohannan et al. | 156/195 |
| 5,061,338 A | * | 10/1991 | Huvey | 156/425 |
| 5,225,019 A | * | 7/1993 | Huvey | 156/173 |
| 5,335,415 A | * | 8/1994 | Okufuji | 29/820 |
| 5,364,489 A | * | 11/1994 | Bailey et al. | 156/356 |
| 5,468,322 A | * | 11/1995 | Menzel | 156/195 |
| 5,665,192 A | * | 9/1997 | Wolki et al. | 156/188 |
| 5,779,838 A | * | 7/1998 | Fellers et al. | 156/195 |
| 5,935,378 A | * | 8/1999 | Wolki et al. | 156/425 |
| 6,096,164 A | * | 8/2000 | Benson et al. | 156/425 |
| 6,230,775 B1 | * | 5/2001 | Smith et al. | 156/425 |
| 6,350,336 B1 | * | 2/2002 | Paquin | 156/93 |
| 6,539,999 B2 | * | 4/2003 | Polzin et al. | 156/425 |
| 6,939,424 B1 | * | 9/2005 | Takala et al. | 156/191 |
| 6,989,067 B2 | * | 1/2006 | Armstrong et al. | 156/187 |
| 7,695,265 B2 | * | 4/2010 | Towfigh et al. | 425/127 |
| 2003/0141011 A1 | * | 7/2003 | Daykin et al. | 156/187 |
| 2004/0200562 A1 | * | 10/2004 | Armstrong et al. | 156/195 |
| 2005/0039842 A1 | * | 2/2005 | Clark et al. | 156/173 |
| 2005/0039844 A1 | * | 2/2005 | Engwall et al. | 156/180 |

FOREIGN PATENT DOCUMENTS

| | | |
|---|---|---|
| EP | 0157096 A | 10/1985 |
| GB | 437101 A | 10/1935 |
| GB | 2313111 A | 11/2007 |
| JP | 2005 280941 | 10/2005 |
| WO | WO 03 089226 | 10/2003 |

* cited by examiner

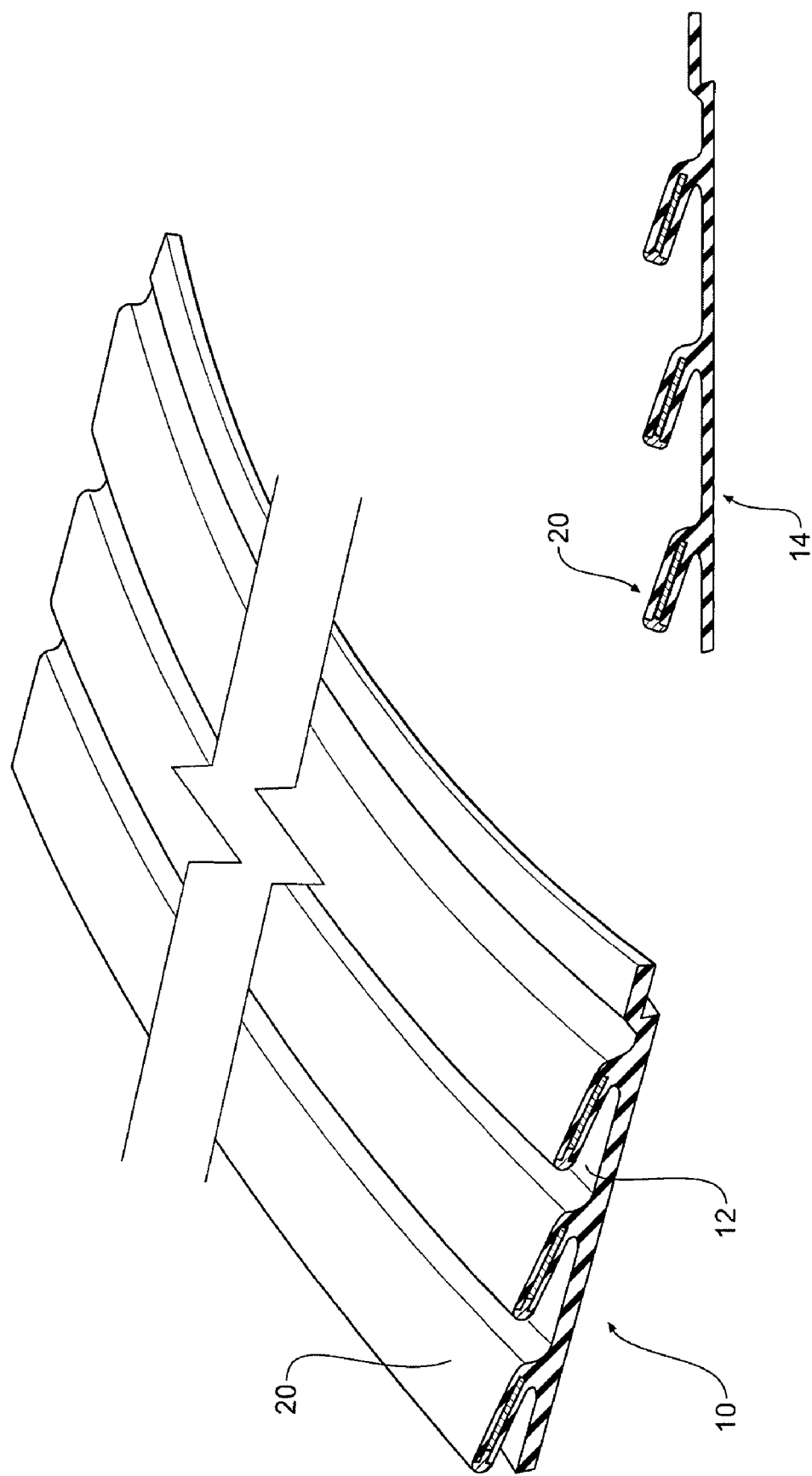

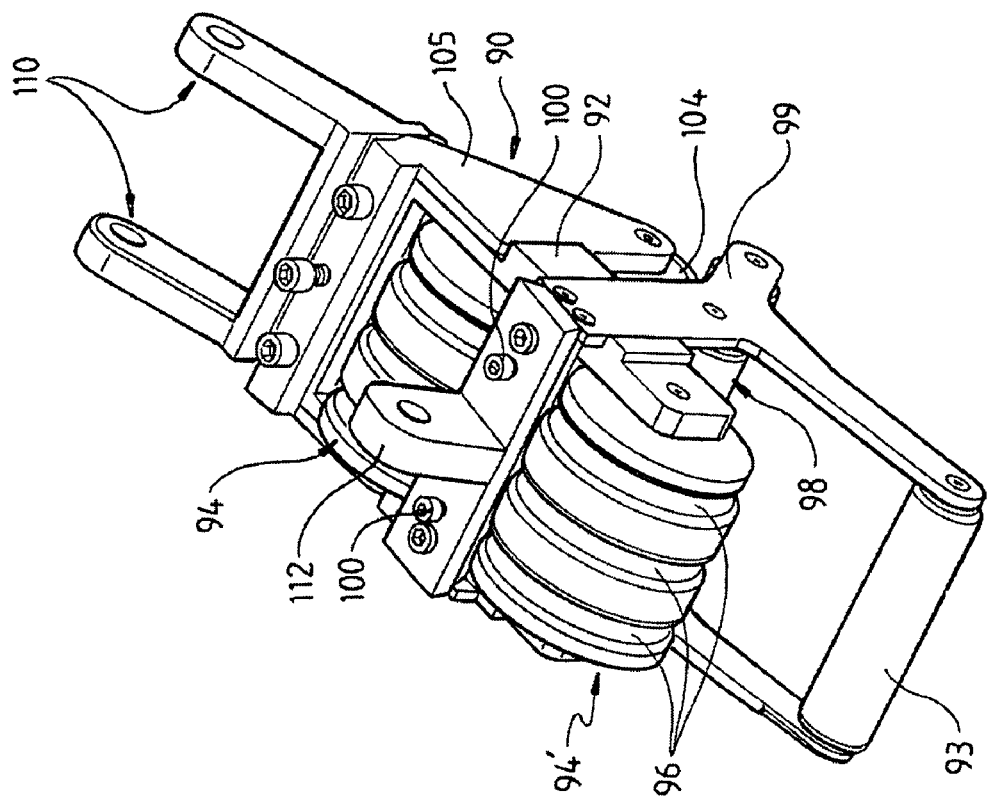
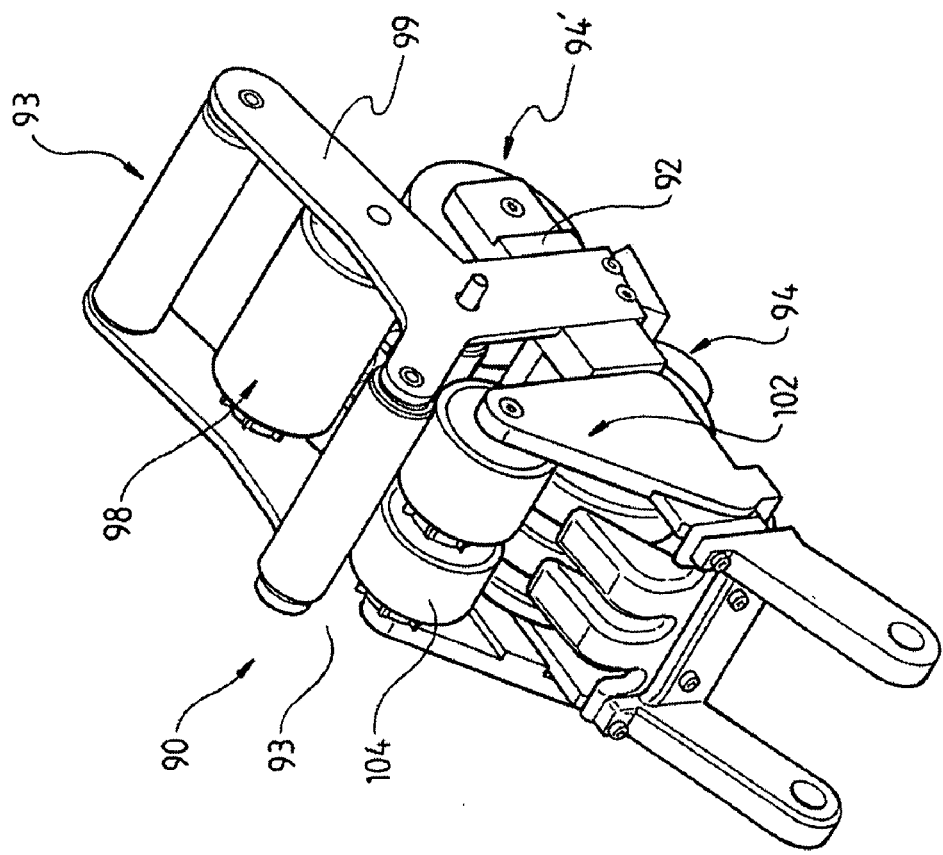
Fig 11b
Fig 11a

METHOD AND APPARATUS FOR STABILIZING STRIP DURING WINDING

FIELD OF THE INVENTION

The present invention relates to helically wound pipes and in particular to apparatus and methods for handling and spooling strips to be wound into helically wound pipes.

BACKGROUND

Plastic pipes can be made by helically winding a plastic strip having series of spaced apart upstanding ribs extending longitudinally. This form of helically wound tube or pipe is already known in the piping industry and is described in patents by the applicant relating both to the form of the plastic strip and to the form of the machine by means of which the pipes or tubes are produced from such strips.

In the past, in order to create high performance pipes it was necessary for the wall thickness of the plastic strip and its ribs to be quite substantial. However, the applicant's Australian Patent No. 2003227090 disclosed an important advance in helically wound pipes. The composite strip disclosed by Patent No. 2003227090 includes an elongate reinforcing strip extending lengthwise and supported laterally by a rib portion (see FIG. 1). The reinforcing strip has a height to thickness ratio of at least 3 to 1 and is orientated substantially perpendicular to the base of the strip. With this composite strip, a stiff pipe, able to withstand significant radial crushing forces can be produced without the need for a strip having a thick plastic base and thick ribs (see FIG. 2 for instance).

When a composite strip, such as the strip described in the applicant's Australian Patent No. 2003227090, or another functionally similar strip, is wound on to a spool for transport after manufacture, difficulties may be encountered. In particular, where the composite strip has been designed for a large diameter pipe, often it is desirable to wind the strip on to a spool having a hub with a diameter substantially less than that of the final wound pipe. It has been found that this can create problems relating to the stability of the reinforcing portion within the composite strip. More specifically, there can be a tendency for the ribs of the composite strip to collapse sideways towards the base as is shown in the background drawings of FIGS. 4, 5, 6 and 7.

Another problem with spooling composite strip of the type discussed above is that if conventional spooling methods and apparatus are used, the tension in the strip becomes so high that the strip is crushed or otherwise damaged in the spooling process.

It is an object of the present invention to provide an apparatus and method that address or at least ameliorates some or all of the afore-mentioned problems.

SUMMARY OF THE INVENTION

According to a first aspect of the invention there is provided a spool winding assembly for winding a composite strip onto a spool having a hub, the composite strip including: an elongate plastic strip having a flat base portion and a plurality of laterally spaced apart lengthwise extending rib portions upstanding from the base portion; and a plurality of elongate reinforcing members extending lengthwise within respective rib portions, the rib portions and the reinforcing members forming composite ribs, the spool winding assembly including: a main frame, a spool holder for rotatably supporting the spool relative to the main frame, a spool drive unit for driving the spool with respect to the main frame, a carriage mounted for lateral movement with respect to the spool, a bender mounted to the carriage for receiving the strip as it is fed towards the hub of the spool and for deforming the strip to give it a curved base portion, and a bender drive unit operably connected to the bender for driving the strip through the bender. Preferably the bender includes: a bender frame, a pair of parallel spaced apart support rollers rotatably mounted to the bender frame, at least one of the support rollers defining grooves for receiving the composite ribs of the composite strip, and a set roller parallel to the support rollers, rotatably mounted to the bender frame and arranged to roll on an inner side of the composite strip, the inner side being a side of the base portion opposite the side from which the ribs extend, the set roller positioned or positionable such that as composite strip is driven between the support rollers and the set roller, the composite strip is deformed such that it exits the bender with a curved base portion.

Preferably the assembly further includes a composite strip having an elongate plastic strip having a flat base portion and a plurality of laterally spaced apart lengthwise extending rib portions upstanding from the base portion; and a plurality of elongate reinforcing members extending lengthwise within respective rib portions, the rib portions and the reinforcing members forming composite ribs, wherein the grooves of the support roller are shaped and sized complementary to the composite ribs such that as the composite strip is driven between the support rollers and the set roller, the composite ribs are held against any substantial lateral movement with respect to the base portion.

According to a second aspect of the invention there is provided a spool winding assembly for winding a composite strip onto a spool having a hub, the composite strip including: an elongate plastic strip having a flat base portion and a plurality of laterally spaced apart lengthwise extending rib portions upstanding from the base portion; and a plurality of elongate reinforcing members extending lengthwise within respective rib portions, the rib portions and the reinforcing members forming composite ribs, the spool winding assembly including: a main frame, a spool holder for rotatably supporting the spool relative to the main frame, a spool drive unit for driving the spool with respect to the main frame, a bender mounted under the spool for movement radially away from the hub as a spool of wound strip grows in diameter, the bender receiving the strip as it is fed towards the underside of the spool and plastically deforming the strip to give it a curved base portion while maintaining the reinforcing strips in a substantially perpendicular orientation with respect to the base portion, and a spool drive unit for driving the strip through the bender. Preferably the bender includes: a bender frame, a pair of parallel spaced apart support rollers rotatably mounted to the bender frame, at least one of the support rollers defining grooves for receiving the composite ribs of the composite strip, and a set roller parallel to the support rollers, rotatably mounted to the bender frame and arranged to roll on an inner side of the composite strip, the inner side being a side of the base portion opposite the side from which the ribs extend, the set roller positioned or positionable such that as composite strip is driven between the support rollers and the set roller, the composite strip is deformed such that it exits the bender with a curved base portion.

Preferably the assembly further includes a composite strip having an elongate plastic strip having a flat base portion and a plurality of laterally spaced apart lengthwise extending rib portions upstanding from the base portion; and a plurality of elongate reinforcing members extending lengthwise within respective rib portions, the rib portions and the reinforcing members forming composite ribs, wherein the grooves of the support roller are shaped and sized complementary to the composite ribs such that as the composite strip is driven between the support rollers and the set roller, the composite ribs are held against any substantial lateral movement with respect to the base portion.

Preferably the assembly further includes: a carriage mounted for lateral movement with respect to the spool, a pair of support arms, each support arm having a lower end slidably mounted to the carriage, an intermediate section and an upper end pivotally connected to the bender, and a first tie arm, the first tie arm having a lower end connected to the carriage and an upper end connected to the intermediate section of one of the support arms, wherein the support arms and the first tie arm allow the bender to move radially away from the hub as a spool of wound strip grows in diameter without rotating the bender with respect to the main frame.

Preferably the lower ends of the support arms are connected by a second tie arm so as to maintain their relative spacing.

According to a third aspect of the invention there is provided an apparatus for winding an elongate strip having a plurality of upstanding ribs onto a spool having a hub, the apparatus including: a frame, a spool holder for rotatably supporting the spool relative to the frame, a guide assembly for guiding the ship generally tangentially towards the hub, the guide assembly movable relative to the spool in a direction parallel to an axis of spool rotation, a string of grooved rollers arranged so as to rotate about spaced apart parallel axes, each roller held in a spaced apart relationship from an adjacent roller by a pair of links, each pair of links pivotally movable with respect to an adjacent pair of links, the string extending partially around the hub and having first and second ends connected to the guide assembly for movement with the guide assembly relative to the spool, and a means for maintaining a substantially constant tension in the string as the spool is wound, wherein the rollers press the strip radially inwards towards the axis of the spool and the grooves surround the ribs of the strip as it is curved around the spool thereby supporting the ribs.

According to fourth aspect of the invention there is provided a method of winding a composite strip onto a spool having a hub, the strip having a plurality of laterally spaced apart lengthwise extending rib portions upstanding from the base portion, the method comprising the steps of: feeding the strip towards the hub of the spool, driving the fed strip through a roller set so as to plastically deform the strip to give it a curved base portion, and winding the deformed strip onto the hub to form spooled strip, the winding creating tension in the strip, wherein the plastic deformation of the strip through the roller set substantially reduces the tension in the strip that would otherwise occur. Preferably the rib portions are held upstanding from the base portion as they are driven through the roller set, whereby the orientation of the rib portions with respect to the base portion remains substantially unchanged. Preferably the method further comprises varying the axial position on the spool to which the strip is guided. Preferably the step of driving and deforming the strip to give it a curved base portion produces a radius of curvature of between 120% and 80% of a radius of the hub.

According to a fifth aspect of the invention there is provided a method of winding an elongate ribbed strip onto a spool having a hub, the method including the steps of: guiding the strip generally tangentially towards the hub, winding the strip around the hub, and supporting the ribs of the strip while the strip is bent around the hub. Preferably the method further comprises varying the axial position on the spool to which the strip is guided.

Specific embodiments of the invention will now be described in some further detail with reference to and as illustrated in the accompanying figures. These embodiments are illustrative, and are not meant to be restrictive of the scope of the invention.

BRIEF DESCRIPTION OF THE DRAWINGS

Preferred embodiments of the invention are illustrated in the accompanying representations in which:

FIG. 4 shows the strip of FIG. 1 with the ribs in a collapsed condition.

FIG. 5 is a cross-sectional view of the strip of FIG. 4.

FIGS. 11a and 11b are perspective views of the bender component of the spool winding assembly shown in FIG. 8.

DETAILED DESCRIPTION OF PREFERRED EMBODIMENTS OF THE INVENTION

Figure 1:
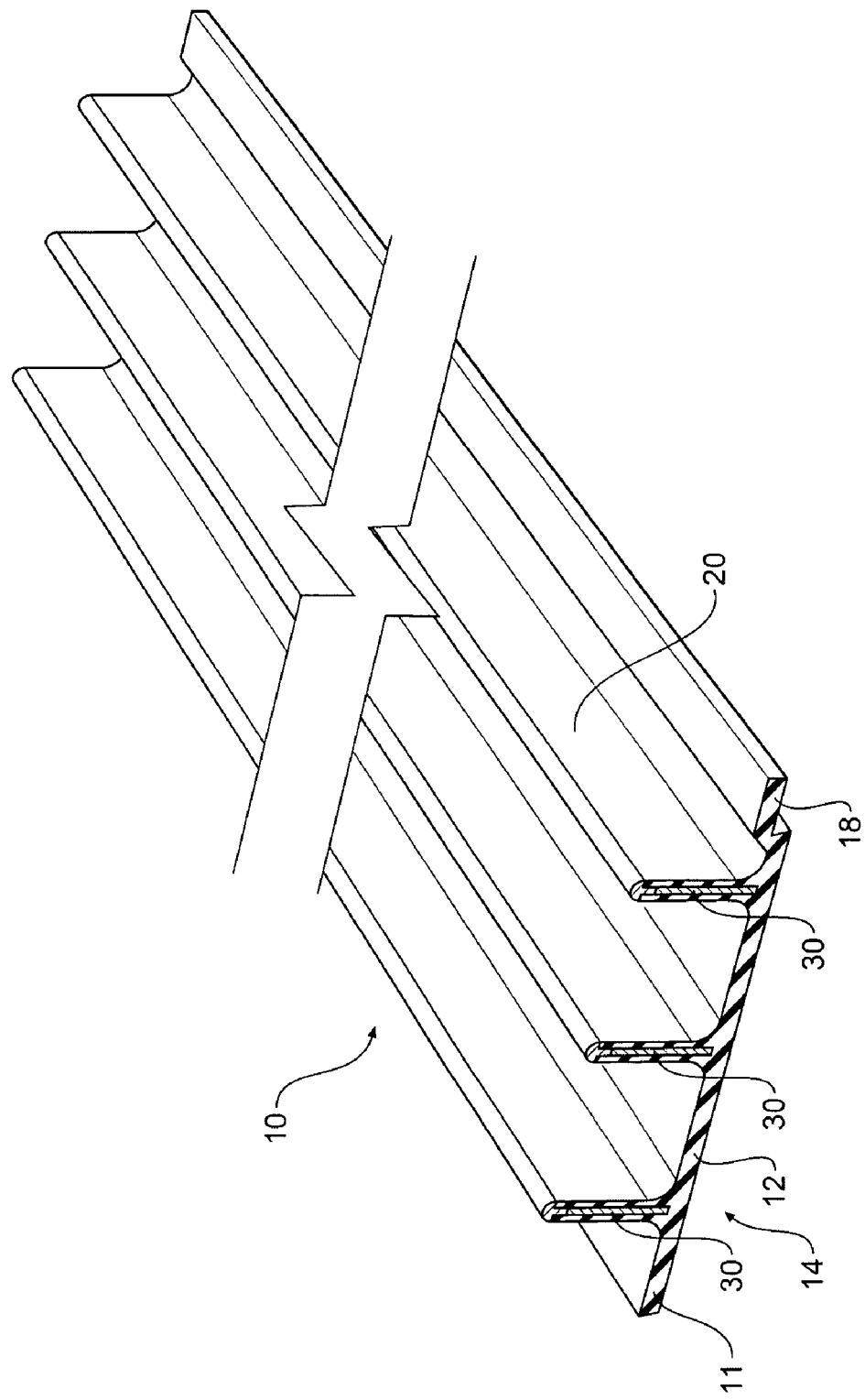
FIG. 1 shows a composite strip windable into a helical pipe.
Figure 2A:
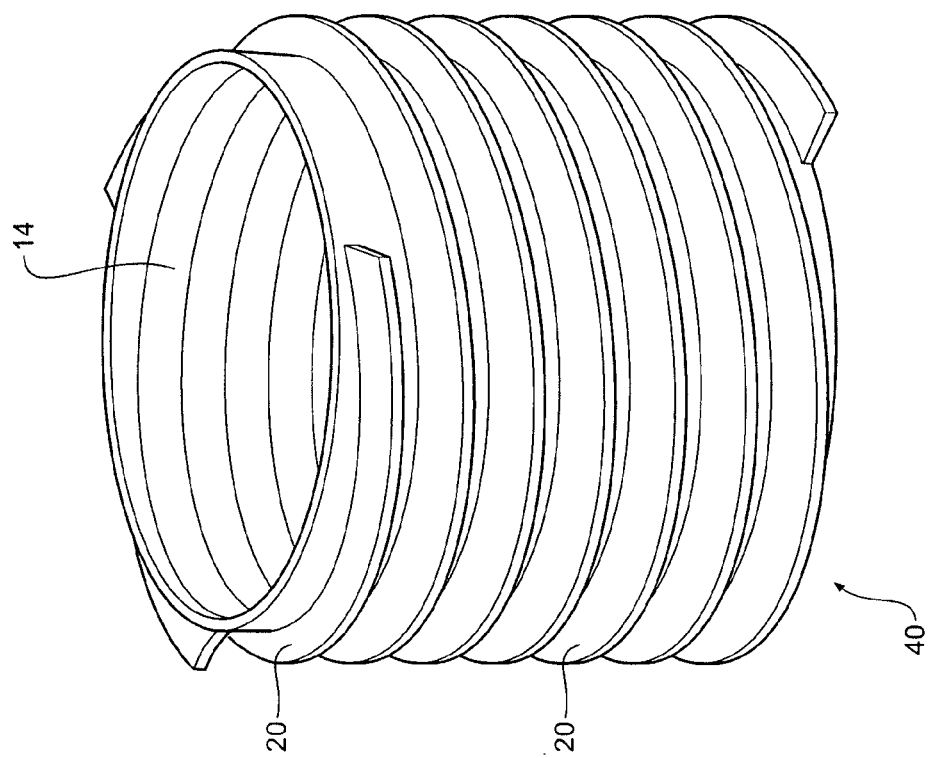
FIG. 2 shows a helical pipe wound from the strip of FIG. 1.
Figure 3:
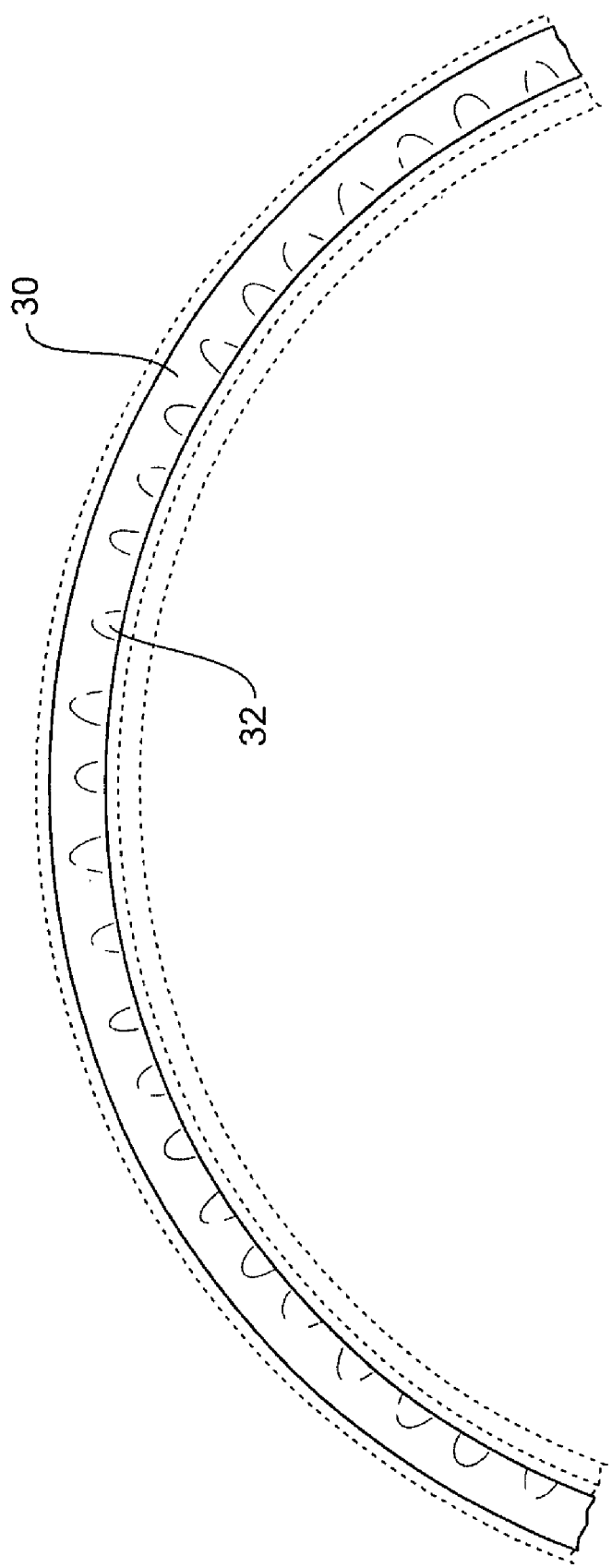
FIG. 3 shows a portion of the reinforcing strip within the pipe shown in FIG. 2.
Figure 7:
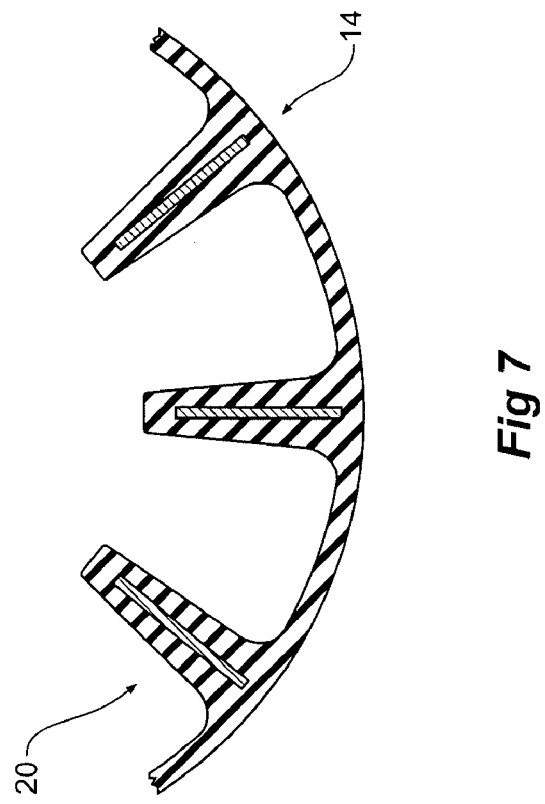
FIG. 7 is a cross-sectional view of the strip of FIG. 6 in a collapsed condition.
Figure 6:
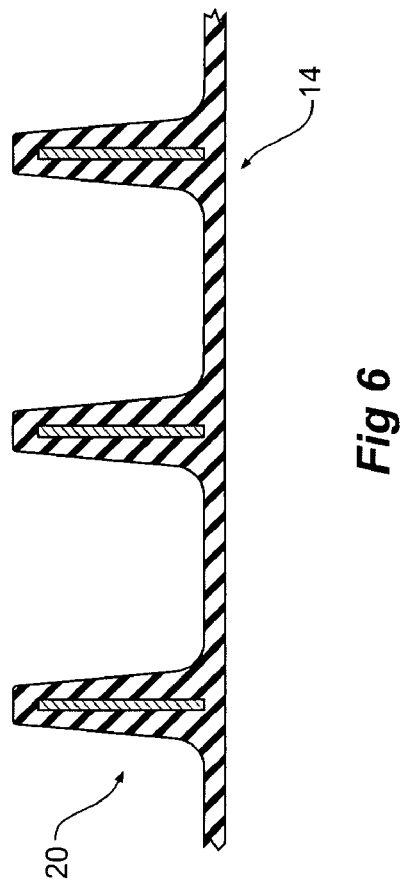
FIG. 6 shows a further strip used on larger diameter pipes.
Figure 8:
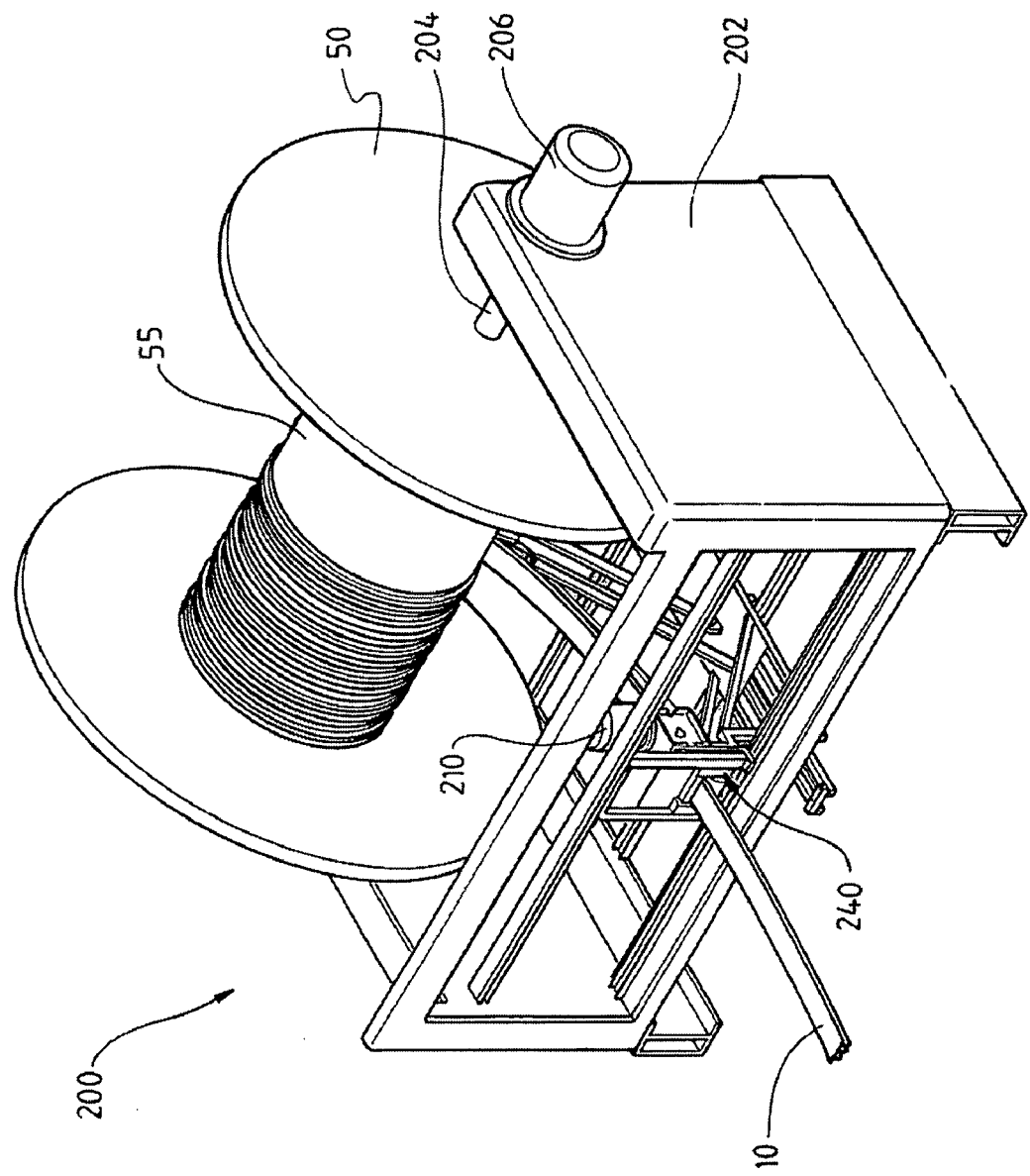
FIG. 8 is a perspective view of a spool winding assembly according to the invention.
Figure 9:
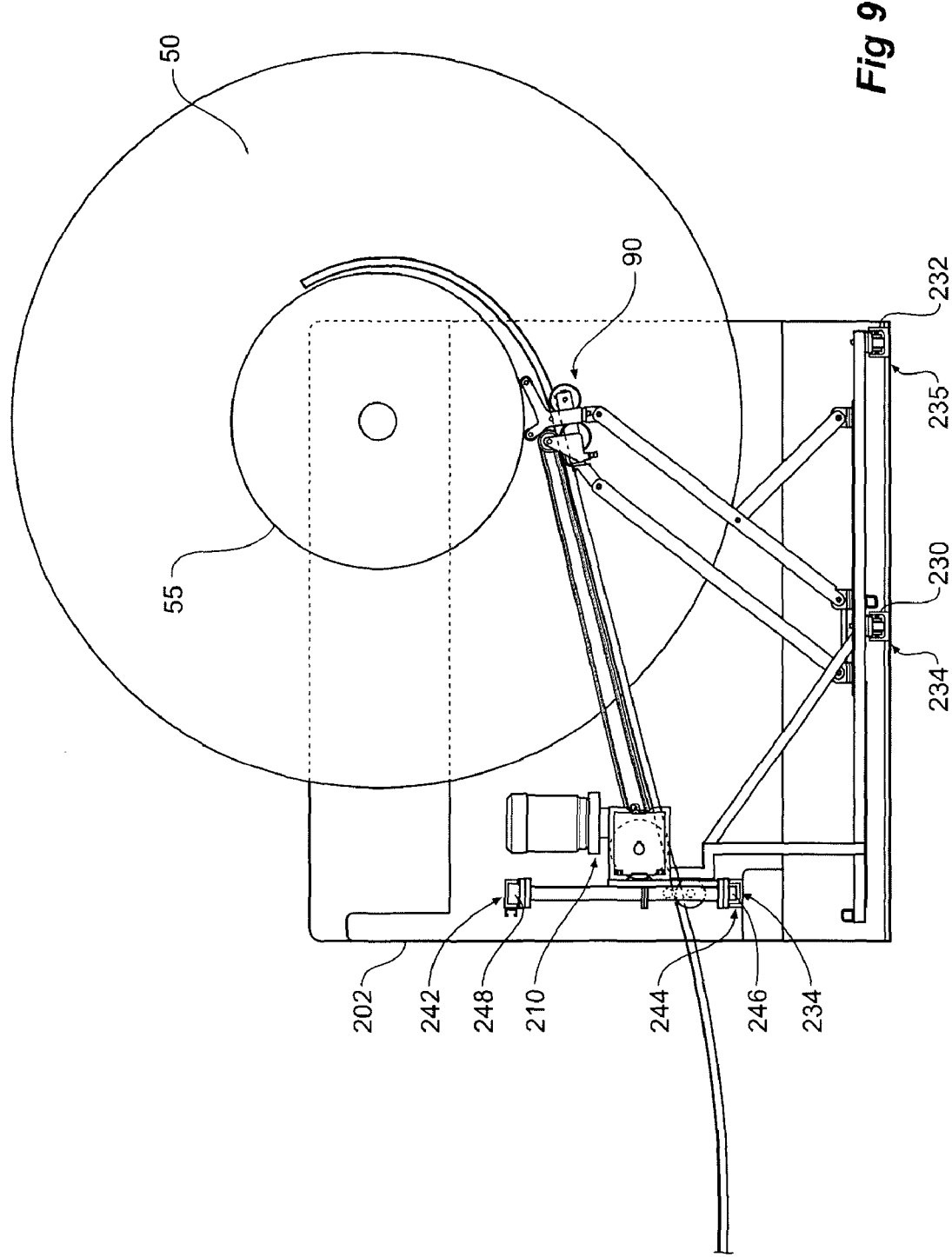
FIG. 9 is a diagrammatic side view of the assembly of FIG. 8.

Shown in FIGS. 1 though 7 is a composite strip that may be wound onto a spool with the present invention. Referring to FIG. 8, a spool winding assembly 200 that accords to a first aspect of the invention is shown. The spool winding assembly 200 is provided to wind a composite strip of the type shown in FIGS. 1 and 6 onto a spool. It comprises, a main frame 202, a spool holder 204 for rotatable supporting the spool 50 relative to the main frame, a spool drive unit 206, a bender 90 and a bender drive unit 210 for driving the strip 10 through the bender 90. The bender 90 is mounted under the spool 50 for movement radially away from the hub 55 as a spool of wound strip grows in diameter. The bender 90 and its drive unit 210 are more clearly shown in FIGS. 9 and 10. The bender 90 receives the strip 10 as it is fed towards the underside of the spool 50 and plastically deforms the strip 10 to give it a curved base portion while maintaining the reinforcing strips 30 (shown for instance in FIG. 1) in a substantially perpendicular orientation with respect to the base portion 12. In another embodiment of the invention (not shown) the bender 90 may be mounted over or adjacent the spool and strip 10 may be fed towards the top side of the hub 55 of the spool.

Figure 10:
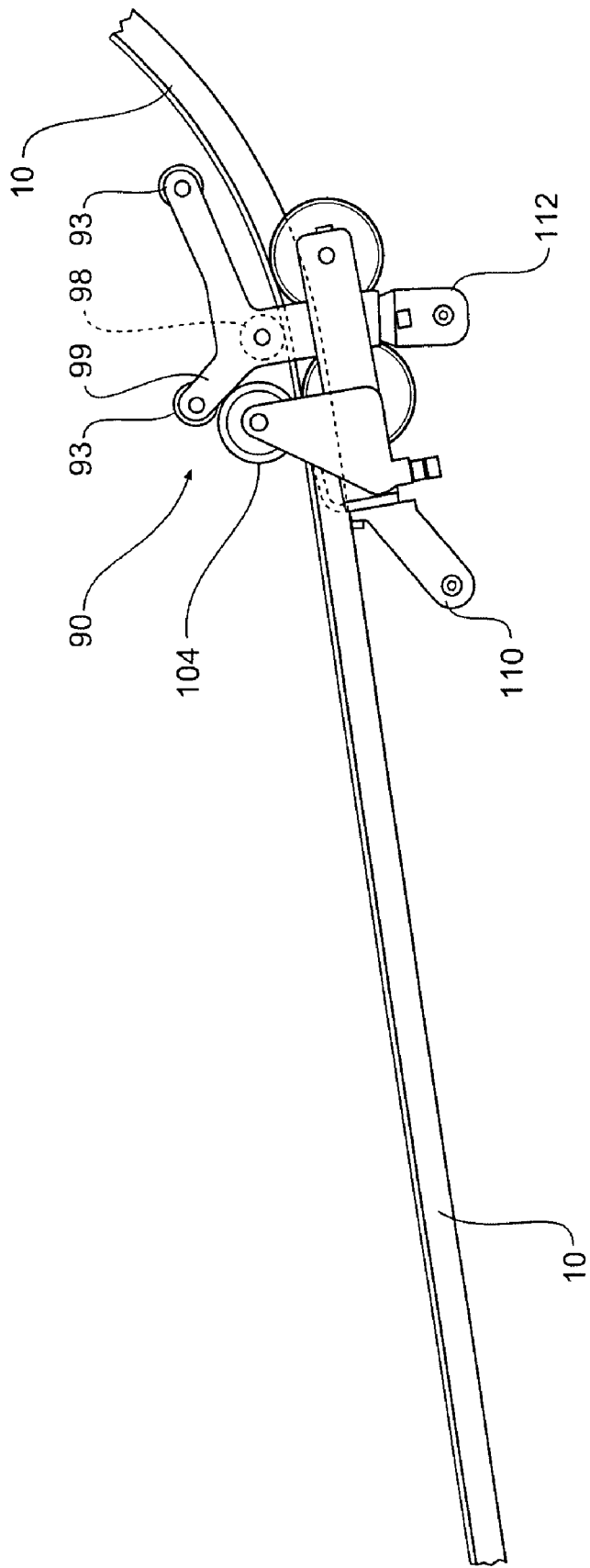
FIG. 10 is a side view of the bender of FIGS. 9 and 10 bending a strip.

The bender 90 is more clearly shown in FIGS. 10, 11a and 11b. Referring to these Figures, the bender 90 comprises a frame 92, a pair of parallel spaced apart support rollers 94 and 94' rotatably mounted to the bender frame 92. As can be seen from FIG. 10, both support rollers 94 and 94' are shaped to define 3 grooves 96 for receiving the rib portions 20 of the strip 10 as is more clearly shown in FIG. 12. A set roller 98 is arranged parallel to the support rollers 94 and is also rotatably mounted to the bender frame 92 by a set roller sub frame 99. The set roller is arranged to roll on an inner side 14 of the composite strip 10. The set roller 98 is positionable such that as the composite strip 10 is driven between the support rollers 94 and the set roller 98, the reinforcing strips 30 within the composite strip 10 are plastically deformed such that the composite strip 10 exits the bender 90 with a curved base portion 12 while maintaining the reinforcing strips 30 in a substantially perpendicular orientation with respect to the base portion 12. This is shown most clearly in FIG. 10. A drive means 102 is provided for driving the strip 10 between the support rollers 94 and the set roller 98.

In this embodiment of the invention, the drive means comprises a drive roller 104 that pinches the strip 10 between itself and a first support roller 94. The drive roller 104 is itself driven by a chain 103 shown in FIGS. 13a and 13b, a bender drive unit 210 drives the chain 103 to cause the drive roller 104 to push the strip 10 between the set roller 98 and the second support roller. Commencement of bending the strip to be spooled is facilitated by the pushing action (a pulling arrangement would be difficult to start).

Figure 12:
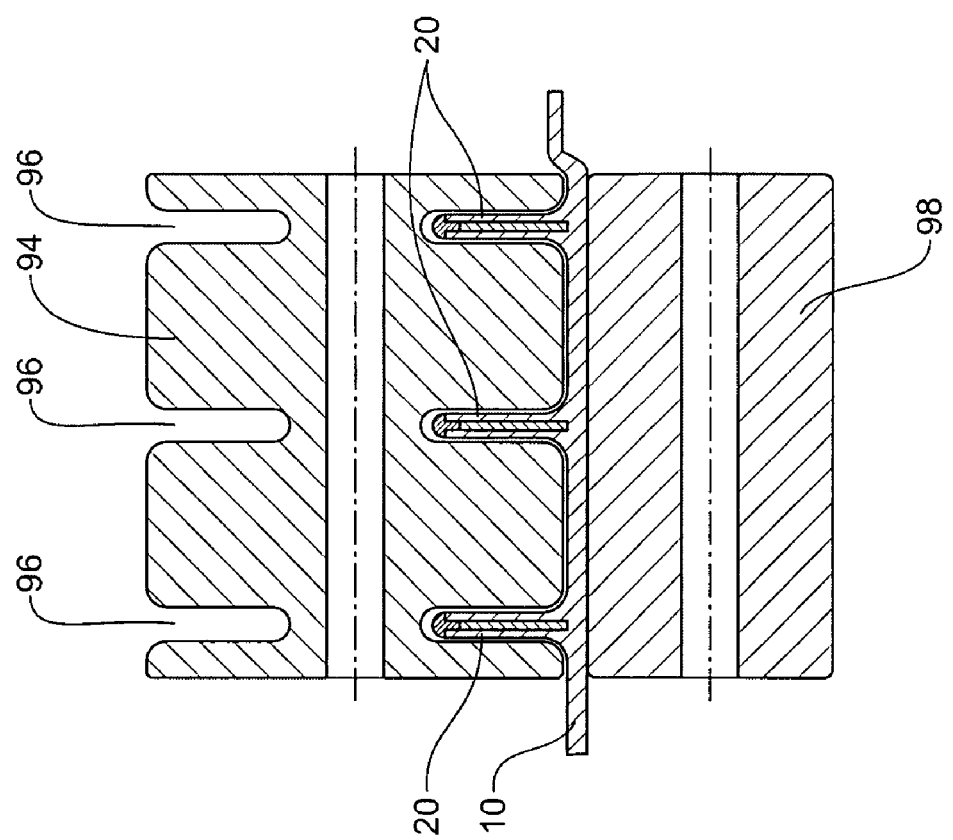
FIG. 12 is a cross sectional view showing detail of a portion of the bender of FIGS. 11a and 11b.

Referring to FIGS. 10, 11 and 12, it can be seen that the set roller 98 is mounted to a set roller sub-frame 99 (that is moveable relative to the support rollers 98) to allow adjustments of the curvature imparted to the composite strip 10. Adjustment bolts 100 are provided for this purpose. It has been found that for optimum spool winding, the degree of curvature imparted by the bender 90 should be similar to the curvature of the hub 55. By approximately matching the radius of the wound strip to the radius of the hub 55, the strip 10 spools readily with a very low tendency to collapse the ribs. As the spool diameter grows, it has been found that it is not necessary to adjust the degree of bending imparted by the bender 90. While some degree of over bending occurs, this does not cause any significant difficulties.

Figure 13A:
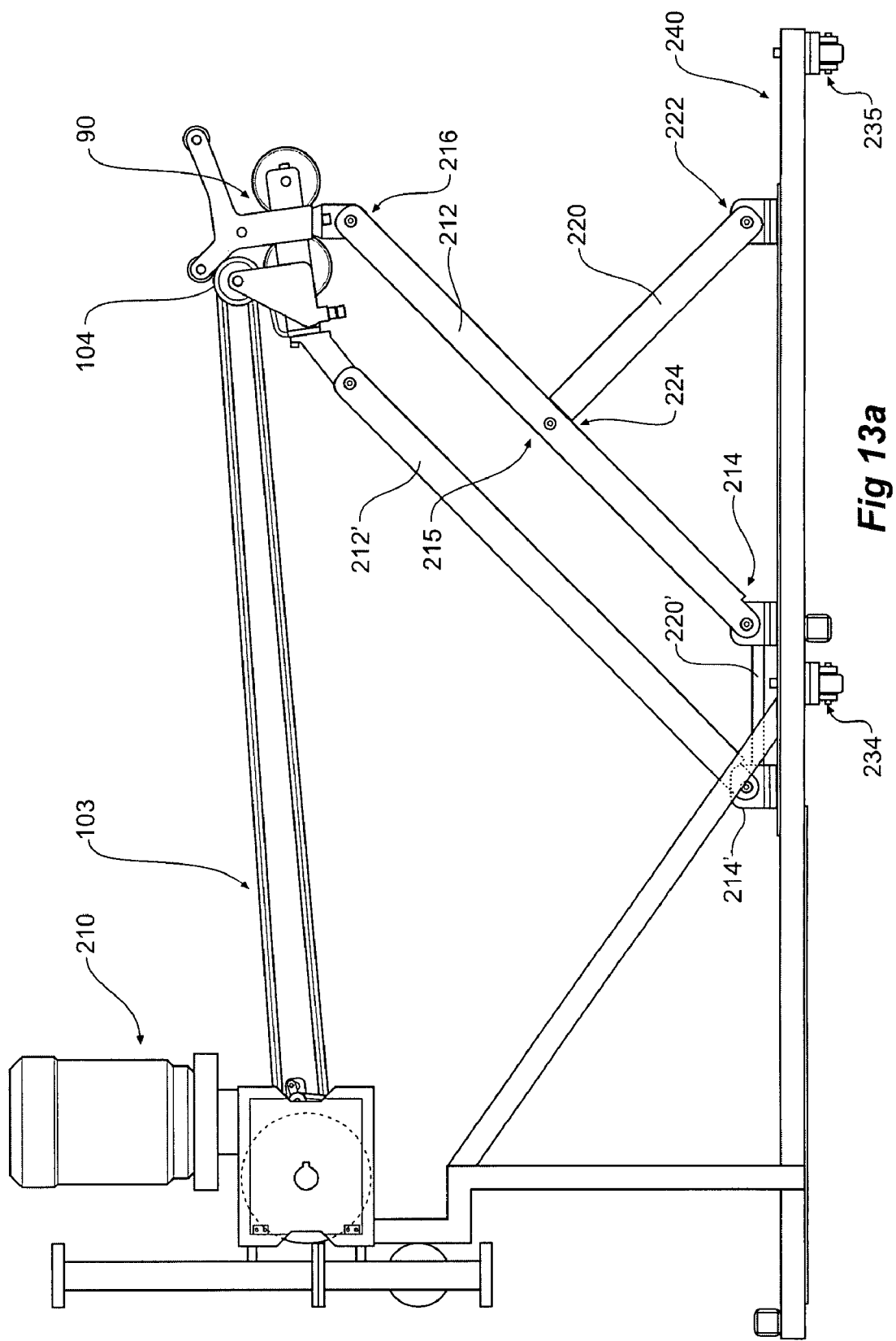
FIGS. 13a and 13b are diagrammatic side views showing the bender of FIGS. 8 to 12 in a raised and lowered condition respectively.

An important element of the spool winding assembly of this embodiment is its ability to keep the bender 90 radially adjacent to the previous convolutions of the spooled strip as the spool grows in diameter. This is achieved by providing a mechanism to move the bender 90 radially away from the hub 55 as the spool of wound strip grows in diameter. This mechanism includes a carriage 240 mounted for laterally movement with respect to the spool 50, a pair of support arms 212 and 212' and a pair of tie arms 220 and 220' as is most clearly shown in FIGS. 13a and 13b. Referring to FIG. 13a, it can be seen that support arm 212 has a lower end 214 that is slidably mounted to the carriage 240 and an upper end 216 which is pivotally connected to the bender 90 at a rear mount 112 on the bender (the rear mount is most clearly shown in FIG. 10). A first tie arm 220 has a lower end 222 that is pivotally mounted to the carriage 240 and an upper 224 that is pivotally mounted to an intermediate section 215 of the support arm 212. Further, a second tie arm 220' links the lower end 214 of a first support arm 212 to a lower arm 214' of second support arm 212'. This arrangement allows the bender 90 to move substantially vertically up and down so that it can remain close to the spool as the spool is wound. Tracking rollers 93, most clearly seen in FIG. 10, roll against the hub 55 and then the actual spool of wound strip as spooling progresses.

In another embodiment of the invention, not shown, tie arm 220' may be arranged in a similar fashion to tie arm 220, that is it may be pivotally mounted to the carriage 240 at one end and pivotally mounted to an intermediate portion of the second support arm 212' at its other end.

Figure 13B:
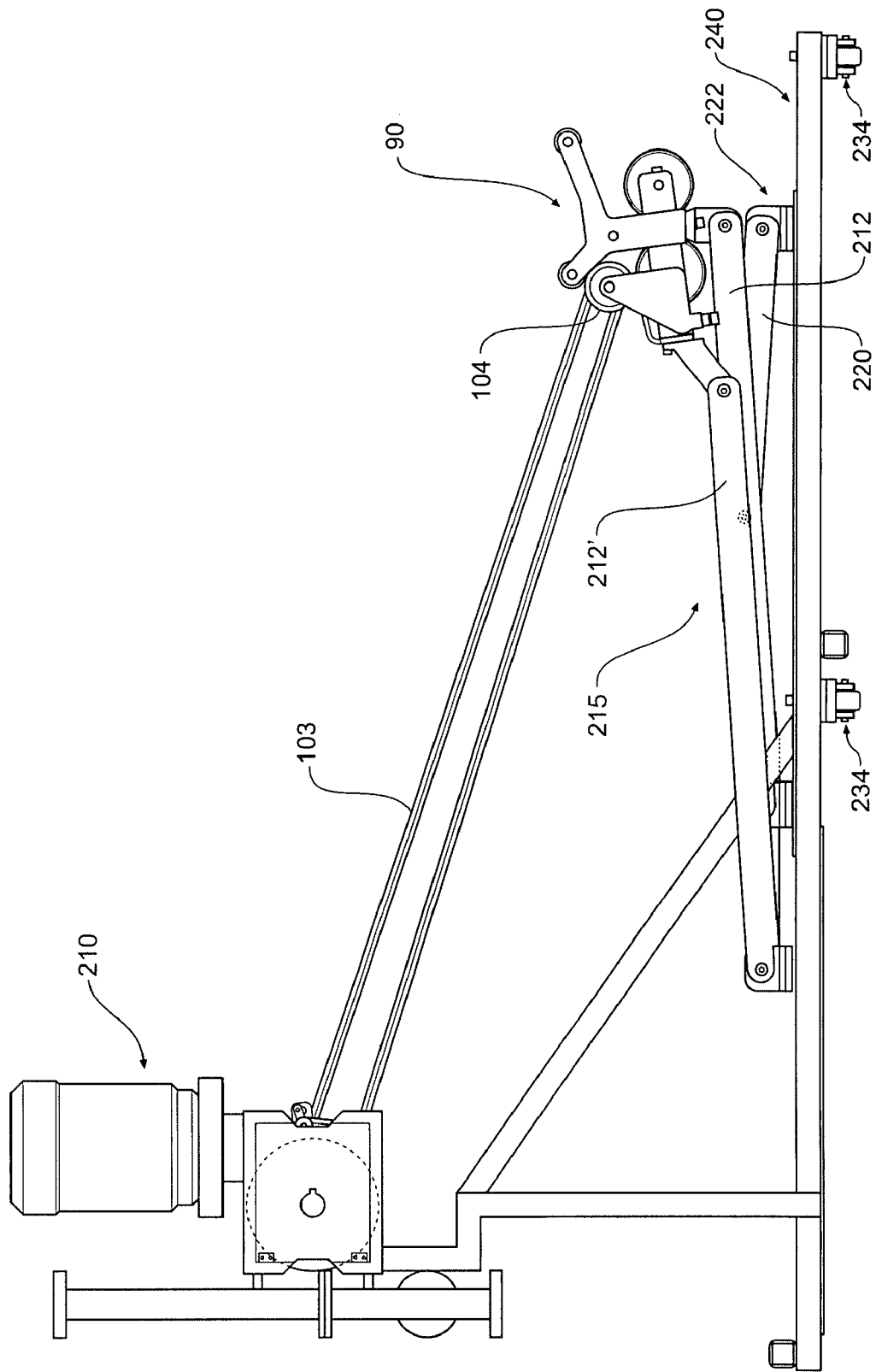

The carriage assembly 240 includes front underside rollers 234 and rear underside rollers 235 most clearly shown in FIGS. 13a and 13b. These rollers run in front and rear underside channels 230 and 232 shown in FIG. 9. Upper and lower channels 242 and 244 also mounted to the main frame 202. Guide rollers 246 and 248 are also mounted to the carriage 240. This arrangement of rollers and channels allows the carriage 240 to move laterally with respect to the hub 55.

Various drive means can be employed for driving the carriage 240 laterally across the hub as the strip is being wound. For instance, an endless pneumatic cylinder such as that shown in FIG. 15 can be used. A control system is employed to ensure that the carriage moves laterally back and forth across the hub in such a way that the strip is wound in radially distinct layers.

Operation of the spool winding assembly 200 will now be described with reference to the FIGS. 8 to 13a and 13b. Strip 10 is fed through carriage mouth 250, (which ideally includes a plurality rollers) across to the bender 90 and onto the spool 50. The strip 10 is fed towards the spool 50 and is then driven through the roller set comprising support rollers 94 and set roller 98 and drive roller 104 so as to plastically deform the strip 10 to curve the base portion 12 while maintaining the reinforcing strips 30 in a substantially perpendicular orientation with respect to the base portion 12. The now deformed strip 10 is wound onto the hub 55 to form spooled strip. As the spooled strip grows in diameter, the position of the roller set varies so as to maintain its position radially adjacent of the previous convolutions of the spooled strip.

Figure 14:
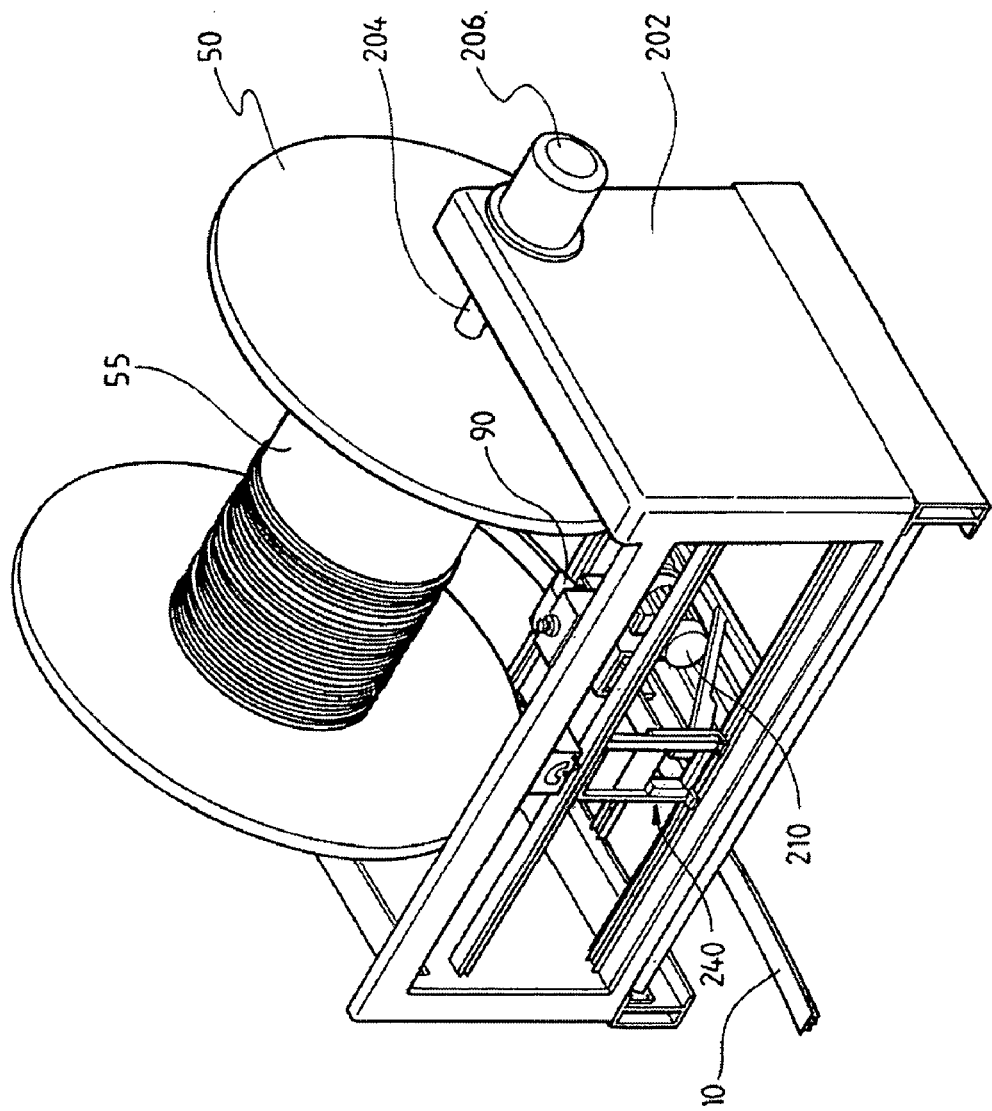
FIG. 14 is a perspective view of a spool winding assembly according to a second aspect of the invention.
Figure 15:
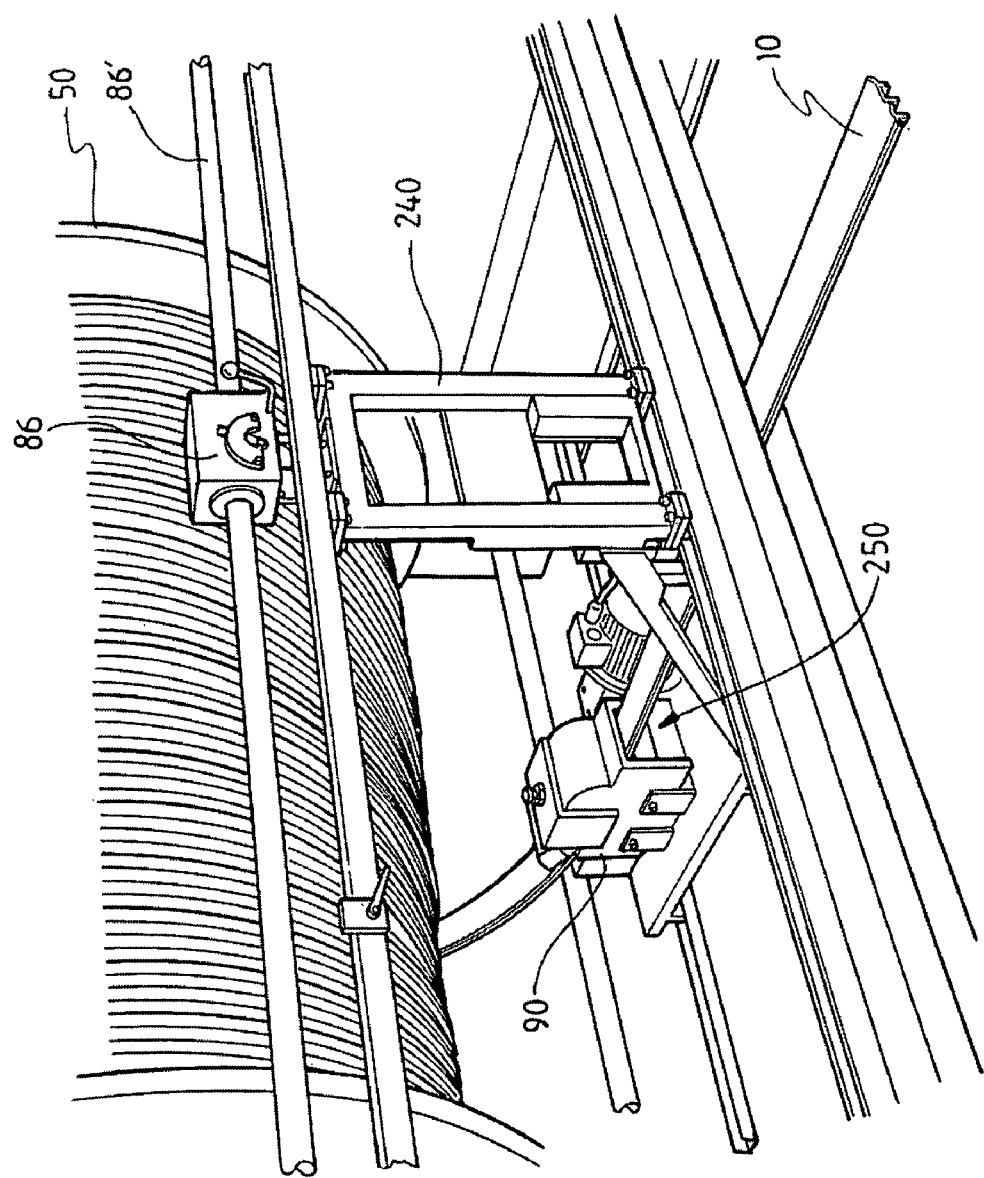
FIG. 15 is a close up underside perspective view of the assembly shown in FIG. 14.
Figure 16:
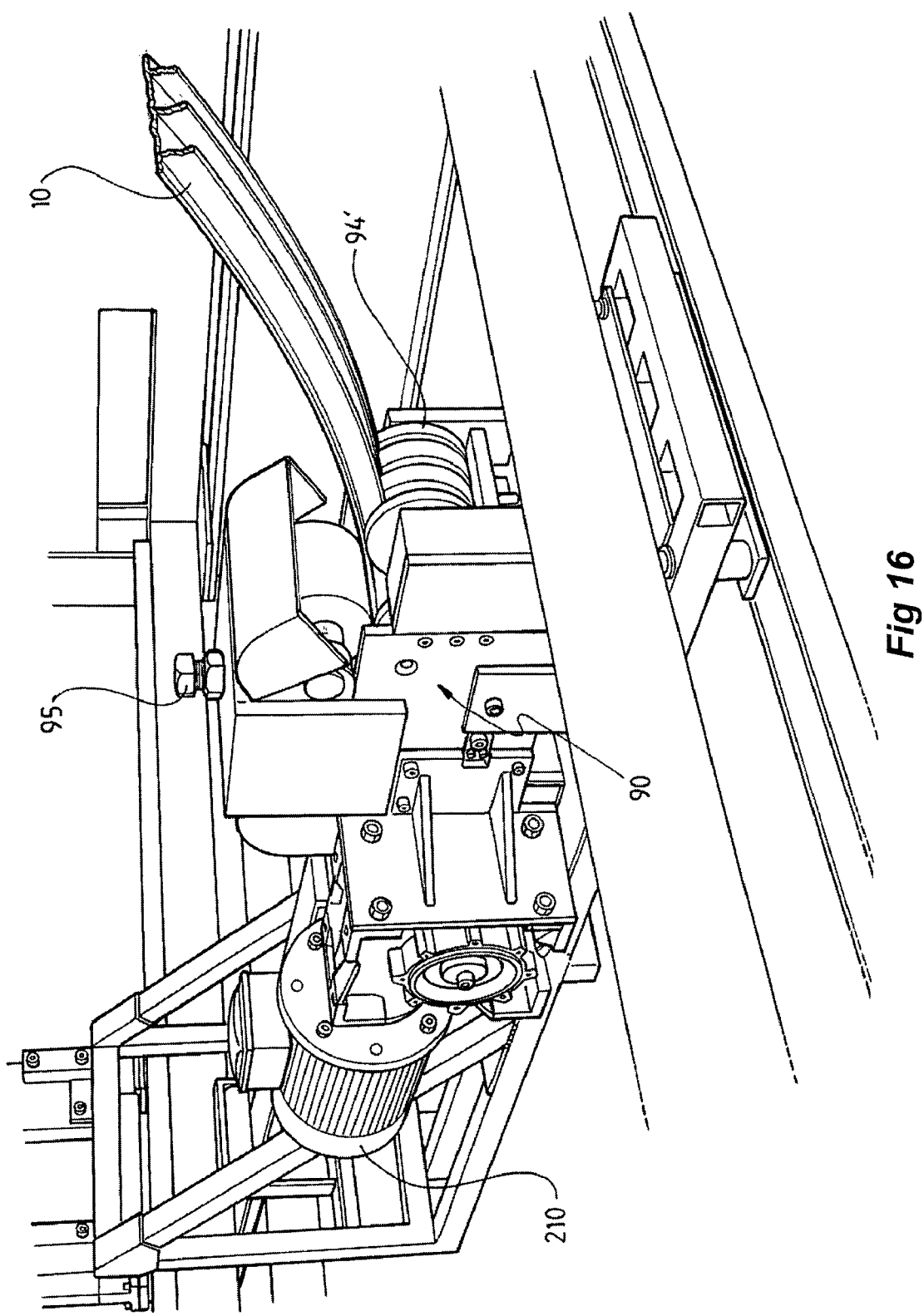
FIG. 16 is a similar view to that of FIG. 15 but shows greater detail from the opposite underside.

A spool winding assembly according to a second embodiment of the invention is shown in FIGS. 14, 15 and 16. This embodiment of the invention is similar to the embodiment of the invention described above but the bender 90 travels only transversely with respect to the spool. It does not travel radially into towards and away from the hub. FIG. 15 in particular shows a friction box 86 mounted to a rod 86' that drives the carriage 240 laterally back and forth from one side of the spool 50 to the other.

FIG. 16 shows the bender unit 90 in more detail. The bender 90 is similar to the bender shown in FIGS. 11 and 12 without the tracking rollers 93.

The bender 90 plastically deforms the strip 10 and the spool drive unit 206 rotates the spool 50 with respect to the main frame to spool the strip 10 after it has been plastically deformed in the bender 90. With this arrangement, the plastic deformation of the strip 10 by the bender 90 substantially reduces the tension in the strip 10 that would be required to wrap the strip 10 around the spool 50. This is important for a number of reasons. One reason is that it enables control of the tension in the strip wound around the hub to be varied independently of the primary bending process. By reducing the tension in the strip around the hub, the tendency to compress and collapse earlier wound convolutions of the strip is reduced.

With this embodiment of the invention, it has been found that for optimum spool winding, the degree of curvature imparted by the bender 90 should be similar to, or slightly less than, the curvature of the hub 55. By approximately matching the radius of the wound strip to the radius of the fully wound spool (which will be greater than the radius of the hub 55) the strip 10 spools readily with a very low tendency to collapse the ribs. While some degree of unsupported bending occurs after the strip passes through the bender 90, this bending on the spool 50 does not cause any significant difficulties.

With this embodiment of the invention, it has been found that spools having a hub size approximately equal to the diameter required in the final wound pipe to be most appropriate.

Figure 17:
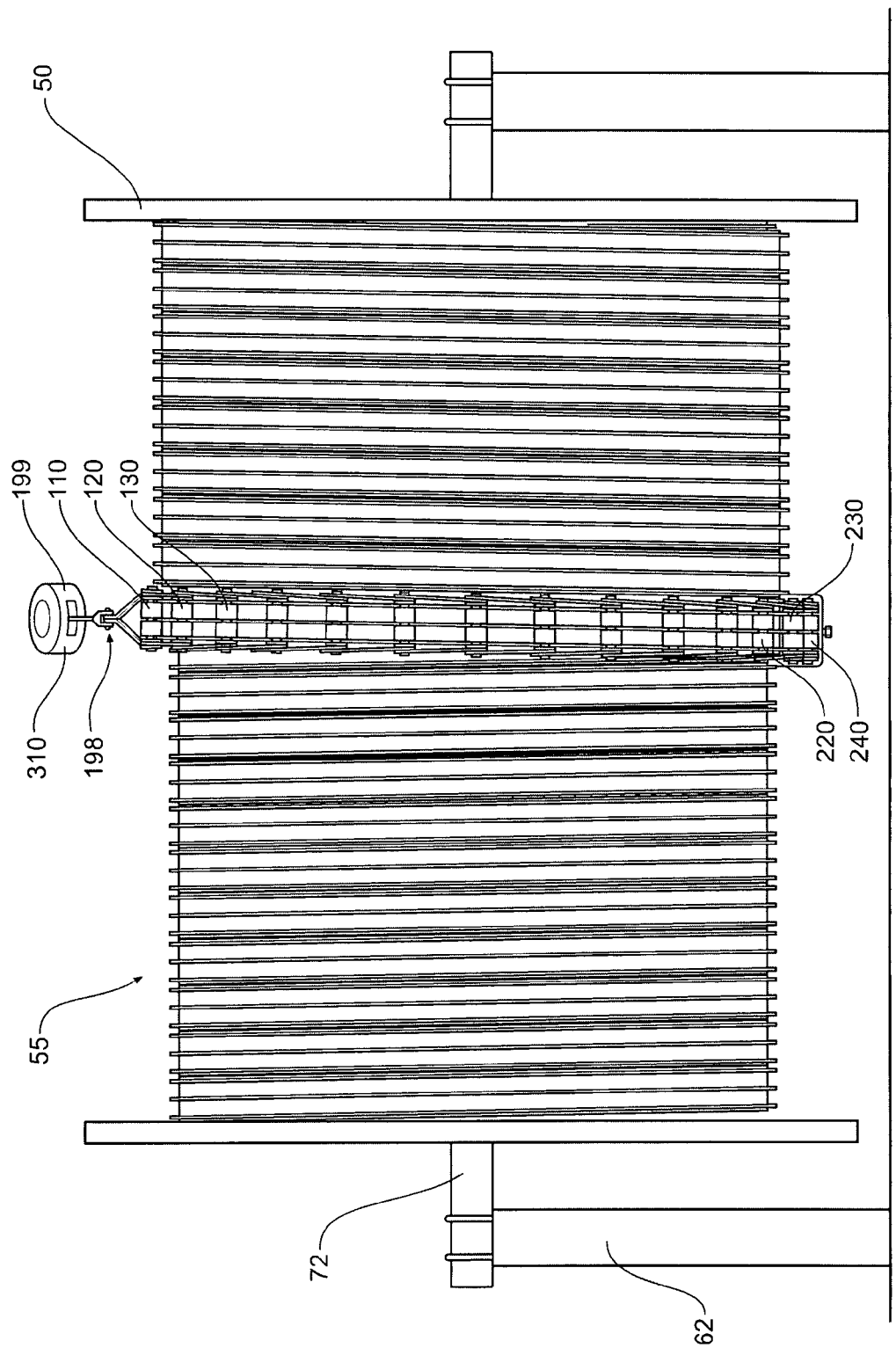
FIG. 17 shows an apparatus according to a third aspect of the invention.
Figure 18:
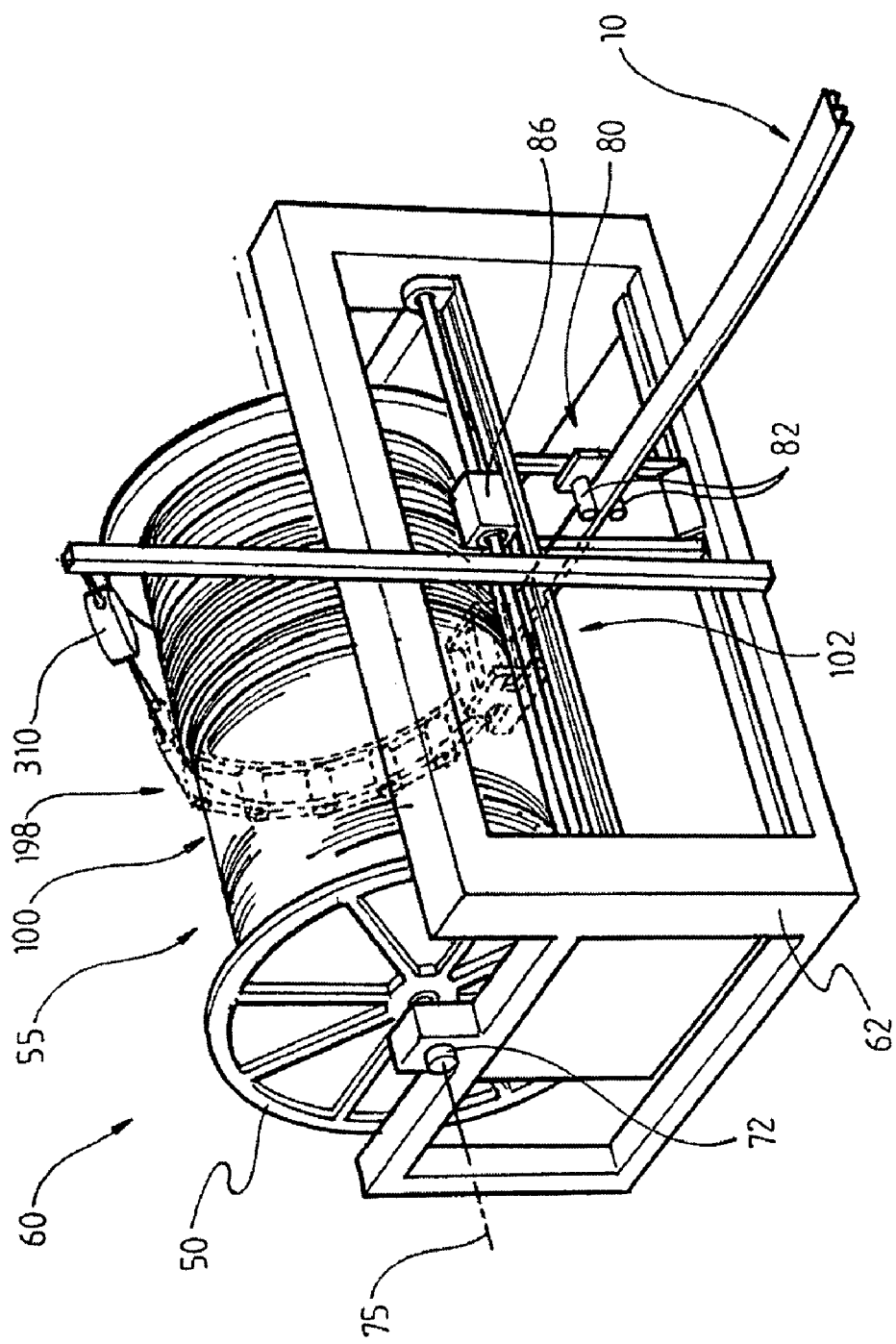
FIG. 18 shows the apparatus of FIG. 16 in perspective view.
Figure 19:
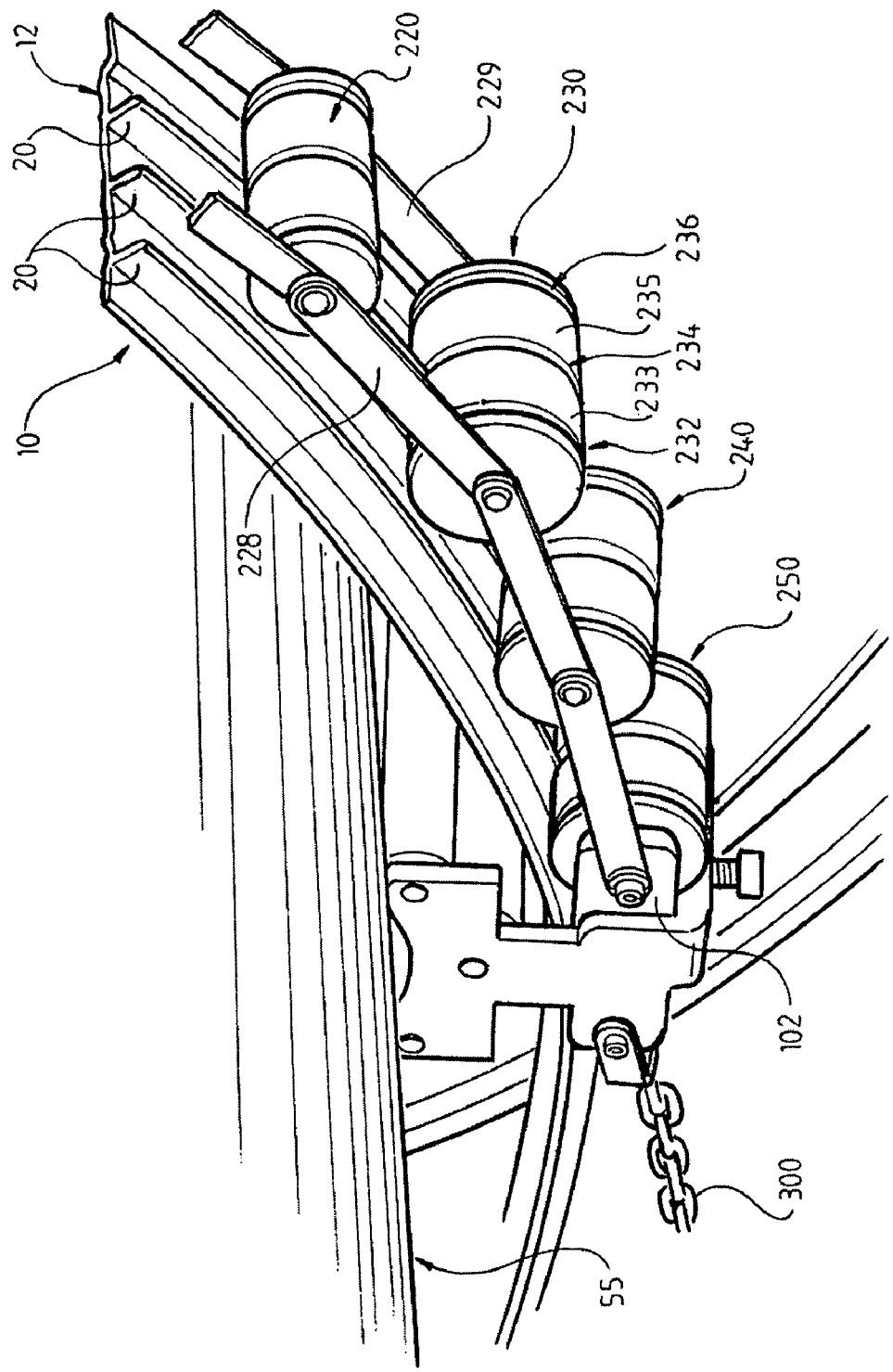
FIG. 19 is a detailed partial underside perspective view of the apparatus shown in FIG. 18.

Referring to FIGS. 17, 18 and 19, an alternative apparatus 60 for winding an elongate ribbed strip 10 onto a spool 50 is shown. The apparatus 60, which accords to a third embodiment of the invention, includes a frame 62, a spool holder in the form of a shaft 72, a guide assembly 80 for guiding the strip generally tangentially towards the hub 55 as is best shown in FIG. 18. The apparatus 60 also includes a string 100 of grooved rollers 110, 120, 130, 140, 150, 160, 170, 180, 190, 200, 210, 220, 230, 240, 250. The grooved rollers are arranged to rotate about spaced apart parallel axes, each roller held in a spaced apart relationship from an adjacent roller by a pair of links, such as the links 228 and 229 between rollers 220 and 230 shown in FIG. 18. Each pair of links is pivotally movable with respect to an adjacent pair of links. The string of rollers 100 extends around the hub 55 and has a first end 102 and a second end 198 connected to the guide assembly 80 for movement with the guide assembly relative to the spool 50 as is most clearly shown in FIG. 18.

A means for maintaining a substantially constant tension in the string 100 as the spool 50 is wound is provided in the form of a cable tensioner 310 as shown in FIG. 18. The cable tensioner 310 retracts or extends cable while maintaining the substantially constant tension. Referring to FIG. 19 it can be seen that roller 230 has three spaced apart grooves 232, 234 and 236. The spacing between the centre line of the grooves matches the spacing between the centre line of the ribs 20 of the strip 10 as is most clearly shown in FIG. 19. Each of the rollers 110 to 250 within the string of rollers 100 has similar grooves to the grooves 232, 234 and 236 shown in FIG. 19. In use, the rollers press the strip 10 radially inwards towards the axis 75 of the spool 50 and the grooves surround the ribs 20 of the strip 10 as it is curved around the spool thereby supporting the ribs 20.

The rollers and their grooves are sized such that there is some clearance between the apex of the ribs and the rollers at the bottom of the grooves as shown in FIG. 12. This allows the cylindrical portions of the rollers, such as portions 233 and 235 of roller 230, to press against the base portion 12 of the strip 10. The pressure exerted by the rollers against the base portion 12 of the strip depends on the tension provided by the tensioning means 310.

In this embodiment of the invention, a clearance of approximately 1 mm is provided between the rollers and the ribs 20. In other applications other clearances may be used.

In use, the strip guide 80 traverses across the face of the hub 55 driven by a friction box or any other means 86 as illustrated in FIG. 18. A control system is provided to ensure that the hub 55 is wrapped evenly with the strip 10.

With all of the embodiments of the invention described above, the strip guide assembly 80 can be fixed to the frame 62 and the spool holder that rotatably supports the spool 50 relative to the frame 62 can be arranged to move laterally with respect to the frame 62. This has the advantage of keeping the strip 10 travelling in a straight line without laterally bending while it is wound onto the spool 50.

While the present embodiments have been described in terms of preferred embodiments in order to facilitate better understanding of the invention, it should be appreciated that various modifications can be made without departing from the principles of the invention. Therefore, the invention should be understood to include all such modifications within its scope.

We claim:

1. A spool winding assembly for winding a composite strip onto a spool having a hub, the composite strip including: an elongate plastic strip having a flat base portion and a plurality of laterally spaced apart lengthwise extending rib portions upstanding from the base portion on one surface of the plastic strip; and a plurality of elongate reinforcing members extending lengthwise within respective rib portions, the rib portions and the reinforcing members forming composite ribs, the spool winding assembly including:
    a main frame;
    a spool holder for rotatably supporting the spool relative to the main frame;
    a spool drive unit for driving the spool with respect to the main frame;
    a carriage mounted for lateral movement with respect to the spool;
    a bender mounted to the carriage configured to receive the composite strip as the composite strip is fed towards the hub of the spool during use and configured to deform the composite strip to give the composite strip a curved base portion; and
    a bender drive unit operably connected to the bender for driving the composite strip through the bender;
    wherein the bender comprises a bender frame; a pair of parallel spaced apart support rollers rotatably mounted to the bender frame, at least one of the support rollers defining a surface configured to contact the flat base portion from which the composite ribs extend, and further defining grooves configured to receive the composite ribs of the composite strip while the flat base portion contacts the surface of the support roller; and a set roller parallel to the support rollers, rotatably mounted to the bender frame and arranged to roll on a side of the base portion opposite the surface from which the composite ribs extend, the set roller positioned such that as the composite strip is driven between the support rollers and the set roller, the composite strip is deformed such that the composite strip exits the bender with a curved base portion.

2. The assembly of claim 1, wherein the grooves of the support roller are shaped and sized complementary to the composite ribs such that as the composite strip is driven between the support rollers and the set roller, the composite ribs are held against any substantial lateral movement with respect to the base portion.

3. A spool winding assembly for winding a composite strip onto a spool having a hub, the composite strip including: an elongate plastic strip having a flat base portion and a plurality of laterally spaced apart lengthwise extending rib portions upstanding from the base portion on one surface of the plastic strip; and a plurality of elongate reinforcing members extending lengthwise within respective rib portions, the rib portions and the reinforcing members forming composite ribs, the spool winding assembly including:
    a main frame;
    a spool holder for rotatably supporting the spool relative to the main frame;
    a spool drive unit for driving the spool with respect to the main frame;
    a bender mounted under the spool configured to provide radial movement away from the hub as a spool of wound strip grows in diameter, the bender being configured to receive the composite strip as the composite strip is fed towards the underside of the spool and plastically deforming the composite strip to give the composite strip a curved base portion while maintaining the reinforcing members in a substantially perpendicular orientation with respect to the base portion; and a bender drive unit for driving the composite strip through the bender, wherein the bender comprises a bender frame; a pair of parallel spaced apart support rollers rotatably mounted to the bender frame, at least one of the support rollers defining a surface configured to contact the flat base portion from which the composite ribs extend, and further defining grooves configured to receive the composite ribs of the composite strip while the flat base portion contacts the surface of the support roller; and a set roller parallel to the support rollers, rotatably mounted to the bender frame and arranged to roll on a side of the base portion opposite the surface from which the composite ribs extend, the set roller positioned such that as the composite strip is driven between the support rollers and the set roller, the composite strip is deformed such that the composite strip exits the bender with a curved base portion.

4. The assembly of claim 3 further comprising:

a carriage mounted for lateral movement with respect to the spool;

a pair of support arms, each support arm having a lower end slidably mounted to the carriage, an intermediate section and an upper end pivotally connected to the bender; and a first tie arm, the first tie arm having a lower end connected to the carriage and an upper end connected to the intermediate section of one of the support arms, wherein the support arms and the first tie arm allow the bender to move radially away from the hub as a spool of wound strip grows in diameter without rotating the bender with respect to the main frame.

5. The assembly of claim 4 wherein the lower ends of the support arms are connected by a second tie arm so as to maintain relative spacing between the support arms.

6. The assembly of claim 4 further comprising:

a carriage mounted for lateral movement with respect to the spool;

a pair of support arms, each support arm having a lower end slidably mounted to the carriage, an intermediate section and an upper end pivotally connected to the bender; and a first tie arm, the first tie arm having a lower end connected to the carriage and an upper end connected to the intermediate section of one of the support arms, wherein the support arms and the first tie arm allow the bender to move radially away from the hub as a spool of wound strip grows in diameter without rotating the bender with respect to the main frame.

7. The assembly of claim 6 wherein the lower ends of the support arms are connected by a second tie arm so as to maintain relative spacing between the support arms.

8. The assembly of claim 4 wherein the grooves of the support roller are shaped and sized complementary to the composite ribs such that as the composite strip is driven between the support rollers and the set roller, the composite ribs are held against any substantial lateral movement with respect to the base portion.

9. The assembly of claim 8 further comprising:

a carriage mounted for lateral movement with respect to the spool;

a pair of support arms, each support arm having a lower end slidably mounted to the carriage, an intermediate section and an upper end pivotally connected to the bender; and a first tie arm, the first tie arm having a lower end connected to the carriage and an upper end connected to the intermediate section of one of the support arms, wherein the support arms and the first tie arm allow the bender to move radially away from the hub as a spool of wound strip grows in diameter without rotating the bender with respect to the main frame.

10. The assembly of claim 9 wherein the lower ends of the support arms are connected by a second tie arm so as to maintain relative spacing between the support arms.

11. An apparatus for winding onto a spool having a hub an elongate strip having a plurality of ribs upstanding from a surface of the strip, the apparatus including:

a frame;

a spool holder configured to rotatably support the spool relative to the frame;

a guide assembly configured to guide the strip generally tangentially towards the hub, the guide assembly movable relative to the spool in a direction parallel to an axis of spool rotation;

a string of grooved rollers arranged so as to rotate about spaced apart parallel axes, each roller defining a roller surface configured to contact the surface of the strip from which the ribs are upstanding, and further defining grooves configured to concurrently receive the ribs, each roller being held in a spaced apart relationship from an adjacent roller by a pair of links, each pair of links pivotally movable with respect to an adjacent pair of links, the string extending partially around the hub and having first and second ends connected to the guide assembly for movement with the guide assembly relative to the spool; and a cable tensioner configured to maintain a substantially constant tension in the string as the spool is wound;

wherein the rollers are adapted to press the strip radially inwards towards the axis of the spool and the grooves surround the ribs of the strip as the strip is curved around the spool thereby supporting the ribs.

* * * * *